Dec. 29, 1964  J. M. MERCHANT  3,163,339
FOLDING CARRY ARM FOR A VEHICLE
Filed May 18, 1962  2 Sheets-Sheet 1

INVENTOR.
J. M. MERCHANT
BY
ATTORNEY

Dec. 29, 1964    J. M. MERCHANT    3,163,339
FOLDING CARRY ARM FOR A VEHICLE
Filed May 18, 1962    2 Sheets-Sheet 2
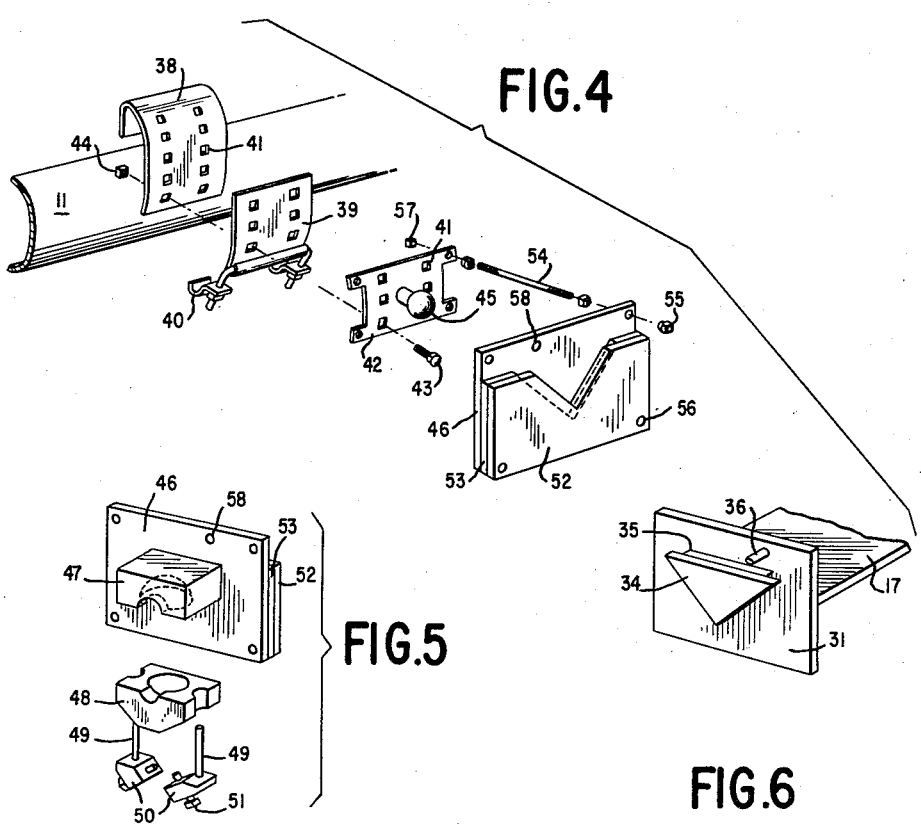
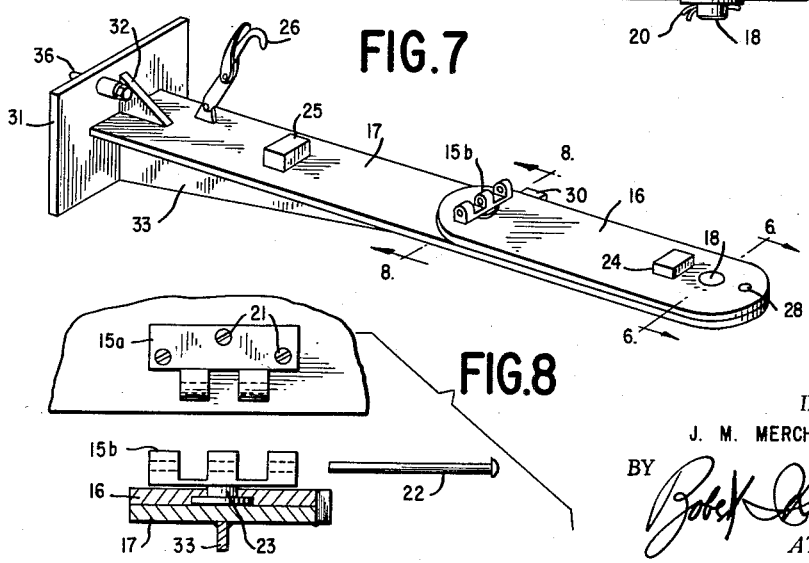
INVENTOR.
J. M. MERCHANT
BY
ATTORNEY

United States Patent Office 3,163,339
Patented Dec. 29, 1964

3,163,339
FOLDING CARRY ARM FOR A VEHICLE
John M. Merchant, 1st Ave. E. at RR St.,
Mobridge, S. Dak.
Filed May 18, 1962, Ser. No. 195,733
10 Claims. (Cl. 224—42.03)

This invention relates to new and useful improvements in vehicle attachments and more particularly to a vehicle bumper-attached arm construction which is foldable and which may serve to carry a variety of large cumbersome articles such as folded camping tent assemblies, all types of cased enclosures such as bird-dog boxes, and utility boxes, as well as spare fuel tanks and baggage.

At the present time more people are utilizing the automobile for jobs other than the mere carrying of passengers. Cars are used increasingly for pleasure sports such as camping and hunting as well as for the carrying of cargo for long distances. In order to fully utilize the vehicle for such diverse uses, it is desirable to provide some means that does not interfere with the passenger space within the vehicle body which means is located outside of the passenger compartment to carry the accessory equipment needed.

It is an object of the present invention to provide a vehicle mounted carry arm which can be easily assembled and disassembled from a vehicle and upon which a variety of items may be carried.

Another important object of this invention is to provide a relatively small vehicle carry arm which can utilize a conventional bumper hitch bracket and which arm can be adjusted in any direction to compensate for the curve in the vehicle bumper.

A still further object of the invention is to provide a carry arm for a vehicle which can be elongated from its carry position to support a platform such as for a pup tent or the like.

Another object of the present invention is to provide a vehicle attached carry arm construction having means thereon to firmly yet releasably secure the load being carried thereto.

Other objects of the invention are to provide a folding carry arm construction for attachment to a vehicle bearing the above objects in mind which is of simple construction, has a minimum number of parts, is relatively inexpensive to manufacture, and is at all times efficient, reliable, and safe in use.

For other objects and for a better understanding of the invention, reference may be had to the following detailed description taken in conjunction with the accompanying drawings in which:

FIGURE 4 is an exploded view of the parts comprising the bumper attachment portion of the carrying arm assembly and a portion of the carry arm which is connected thereto.

FIGURE 5 is an exploded perspective view of the ball and V pocket assembly.

FIGURE 6 is a section along the line 6—6 of FIGURE 7.

FIGURE 7 is a perspective view of one of the carry arms, and FIGURE 8 is an exploded view of the hinge assembly between the carry arm and the load to be carried, the lower portion of the hinge being a section along the line 8—8 of FIGURE 7.

Reference is now made more specifically to the drawings, wherein like numerals designate similar parts throughout the several views and wherein the carry arm assemblies constituting the subject matter of this invention are designated generally at 10.

Figure 1:
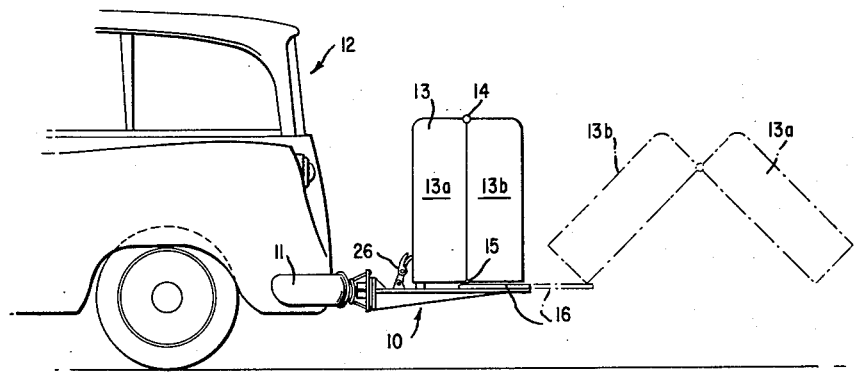
FIGURE 1 is a side elevational view of a vehicle equipped with the carry arms of the invention and carrying a pup tent thereon. The dotted lines show the pup tent in partially opened position.

Each carry arm assembly is preferably secured by means to be later described to the rear bumper 11 of a car, truck, or bus 12. The carry arm assemblies are generally used in pairs to hold the average loads, however depending upon the size of the load to be carried and the particular bumper curvature, three or possibly more such assemblies are anticipated.

Each of the carry arm assemblies is composed of two component groups; the bumper attached portion and the carry arm.

The load to be carried by the assemblies can of course be any large enclosure, but for the sake of illustration a folding pup tent floor 13 is shown. Such a floor is generally made up of two identical floor sections 13a and 13b hinged together as at 14. Additionally the lower inside edge of the right-hand floor section 13b is hinged as at 15 to the upper pivot link 16 of the carry arm. The pivot link is in turn pivotally mounted on the support plate 17 by means of a pivot pin 18 which as shown in FIG. 6, passes through both the pivot link and the support plate and has its head 19 recessed within a counterbored hole in the pivot link. A cotter pin 20 serves to retain the parts in assembled relation.

Hinge 15 is generally a piano hinge and comprises upper hinge 15a attached as by screws 21 to the floor section 13b, lower hinge 15b and hinge pin 22. Lower hinge member 15b is mounted for rotation about the vertical axis on the pivot link by means of a headed pivot pin 23 which is recessed within a counterbore in the lower face of the pivot link as more clearly shown in FIGURE 8.

The folded or cased pup tent may be stored within the closed floor sections when they are in their carry position of FIGURE 1. In this position, the floor ends rest on block members 24 and 25 secured to members 16 and 17 respectively, and the floor section 13a is secured to the carry arm by a releasable toggle catch 26 which is pivotally mounted on the support plate 17 and which engages within a recess 27 in the floor section. Of course many other types of conventional holddowns may be used.

Figure 2:
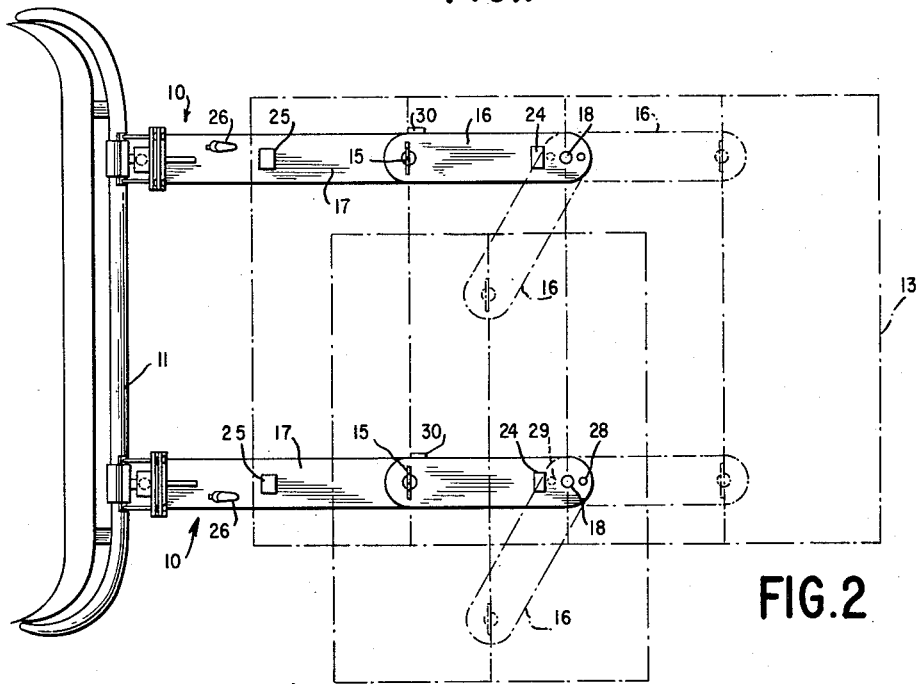
FIGURE 2 is a top view of the carry arms and pup tent attached to a vehicle and showing in dotted lines the progressive unfolding of the pivot arm.

In order to open the pup tent floor in operative position to receive a pup tent once the vehicle has reached its destination, the toggle catches 26 on each carry arm are released from the recesses 27 and the folded floor is then swung in the manner shown in dotted lines in FIGURE 2. This swinging is similar to a pantograph or parallelogram movement and is achieved by the two pivot members 18 and 23. If desired, locking means such as the two aligned holes 28 and 29 for reception of a pin not shown, may be provided to retain the pivot link in its use or operative position on the support plate. Once the carry arm is in its extended position the outermost floor section which will be 13a can be lifted slightly and pulled outwardly pivoting on the hinge 14. At the same time the innermost floor section 13b will pivot about its lower inside edge utilizing the hinges 15.

As can be readily seen from the dotted line view in FIGURE 2, the floor when opened in its entirety is supported well clear of the vehicle and need not be detached therefrom. The pup tent can then be erected on the floor and, if desired, additional screw jack bases can be placed under the floor for added support.

The above steps are merely repeated in reverse order to collapse the floor and to fold it back into place on the carry arm. A stop 30 is provided on the support plate 17 against which the pivot link 16 will abut to limit its path of movement.

Each carry arm support plate is welded or otherwise attached to a vertical plate 31 and strengthening webs 32 and 33 provided as shown. A triangular coupling tongue 34 is secured to the opposite face of the plate and is spaced therefrom by a spacer block 35. The top of the spacer block is flush with the top of the tongue but the dimensions of the block are smaller than the tongue so that the sides and apex of the triangular tongue overlap the block providing side channels.

A spring-biased lock pin 36 is mounted in a cylinder 37 for securing the carry arm to the bumper attached portion as latter described. It is anticipated that any conventional lock means may also be used in place of the aforementioned lock pin.

The bumper attached portion of the carry arm construction incorporates many parts which are readily available and used for trailer hitches and the like. Several changes have been made however to provide for a novel universal adjustment whereby the carry arms can be located parallel to one another and parallel to the vehicles center line regardless of bumper curvature.

The bumper attached portion includes a two piece sheet metal bumper bracket 38, 39. Member 38 is provided with a hook-shaped upper edge which clasps the upper portion of the bumper. Member 39 is provided with bumper engaging hooks 40 which are slidable on the arms of a U-shaped threaded shaft which is secured to the bottom of member 39. Nuts are provided below each of the hooks for tightening them about the lower portion of the automobile bumper. Square holes 41 are punched in each of the members in two rows as shown in FIGURE 4.

A ball platform plate 42 also has mating square holes 41 punched therein. Four bolts 43 having squared shoulders are provided for securing the members 38, 39 and 42 together and receive nuts 44. The variety of holes easily provides for attachment to any bumper regardless of its height. The holes in plate 42 permit adjustment whereby the plate is aligned with the vertical. A hitch ball 45 is attached to plate 42 as by the post shown which may be screw threaded into a recess in the plate face if desired. While the means of fastening is not critical, it should extend from the plate horizontally.

The remaining element in the bumper attached portion is the ball and tongue receiving assembly which comprises a generally rectangular plate 46 having secured as by welding to one side face thereof an upper ball hitch socket 47. This cooperates with a lower ball socket 48 to hold the hitch ball 45 securely therein. Rods 49 which pass through cut-outs in the lower socket and are received in the upper socket have lock blocks 50 secured to the lower ends thereof and adjusting screws 51 threaded therethrough. When the hitch ball is placed between the upper and lower sockets and the rods 49 are threaded into the upper block and the screws 51 tightened, the hitch ball is securely retained from removal. A front plate 52 is secured to the plate 46 but is spaced therefrom by spacer plate 53. Each of the plates 52 and 53 is provided with a V-shaped cut-out as shown in FIGURE 4 but the cut-out in the spacer plate is wider and deeper to provide a V-shaped pocket for reception of the triangular coupling tongue 34.

In order to angularly adjust the ball and tongue receiving assembly on the bumper regardless of the curvature therein, four double threaded rods are passed through corner holes 56 in the receiving assembly and in holes located in corner ears of the plate 42. Four nuts 55, 57 are provided on each shaft, one on each side of the receiving assembly and one each side of plate 42. Each of these nuts has an inner rounded head and the receiving holes are slightly rounded or cupped to accommodate any angle the rods 54 might assume. Adjustment should be made both utilizing nuts 43 and their holes 41 and also the threaded rods 54 and round head nuts 55, 57 so that the V-pocket is aligned both vetrically and horizontally. In some cases when the bumper curve is extreme the receiving assembly will be attached angularly to plate 42 when viewed from above so that it will lie tranverse to the vehicles center line.

Figure 3:
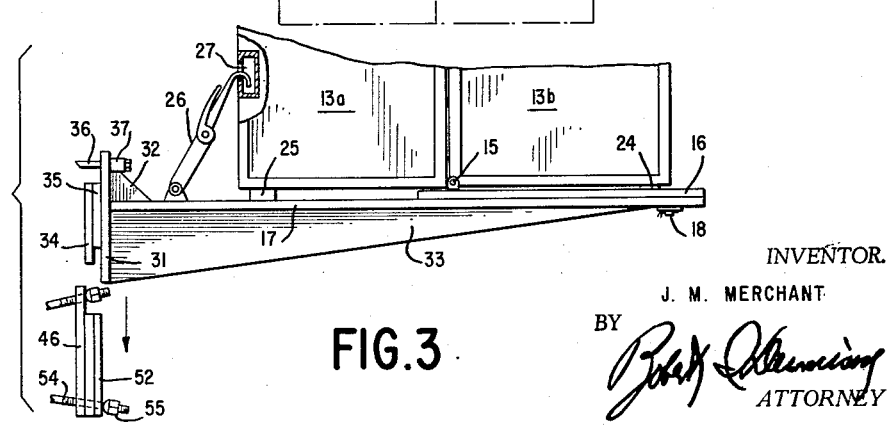
FIGURE 3 is a side view of one of the carry arms showing it about to be lowered into connection with the bumper attachment.

When the carry arm portion is placed down so that the V-tongue 34 is received in the V-pocket defined by plates 52 and 53 (see FIG. 3), spring detent 36 will snap into lock recess 58 formed in the plate 46.

Once the bumper attached portion is adjusted for a given vehicle it may, if desired be left on the vehicle permanently, the carry arm portion being easily attached whenever it is desired to carry a load.

While I have shown and described a preferred embodiment of the invention, it is to be understood that the drawings and detailed disclosure are to be construed in an illustrative rather than a limiting sense since various modifications and substitutions of equivalents may be made by those skilled in the art within the spirit and scope of the invention as defined in the appended claims.

I claim:

1. An article carrying device for a vehicle comprising in combination; a substantially horizontal stationary platform, an elongated movable plate pivoted adjacent one end thereof to said platform and moveable from a folded position overlying said platform to a position extending outwardly of and aligned with said platform, means to attach the article to be carried to said plate, and means to attach said platform rigidly to a vehicle frame.

2. An article carrying device as defined in claim 1, wherein said means to attach said platform to a vehicle frame includes a bumper attached bracket, a tongue fixed to said platform, and a tongue receiving pocket; ball and socket means permitting of universal movement on said bracket and pocket respectively, and means to lock said ball and socket means in adjusted position.

3. An article carrying device for a vehicle comprising in combination; a first stationary horizontal arm, a second movable horizontal arm pivoted on a vertical axis adjacent one end of said first arm, a pivot pin in said second arm, hinge means on one end of said pivot pin for hinged attachment to said article, and means to rigidly attach said first horizontal arm to a vehicle frame.

4. An article carrying device as defined in claim 3 wherein said means to attach said platform to a vehicle frame includes a bumper attached bracket, a tongue fixed to said first horizontal arm, and a plate having a tongue receiving pocket on one side thereof adjustably attached to said bracket.

5. An article carrying device as defined in claim 4 wherein said bumper attached bracket has a hitch ball secured thereto, said plate having a ball socket on the other side thereof for universal pivotal reception of said hitch ball, and means to secure said bumper bracket in adjusted position to said plate.

6. An article carrying device for a vehicle comprising in combination; a horizontal foldable load supporting platform, said platform including two sections pivoted together; a bracket attached to the vehicle frame, means adjustably connecting said platform to said bracket for adjustment in both vertical and horizontal directions.

7. An article carrying device for a vehicle as defined in claim 6, wherein said means adjustably connecting said platform to said bracket includes a tongue fixed to said platform, and a plate having a tongue receiving pocket on one side thereof adjustably attached to said bracket.

8. An article carrying device for a vehicle as defined in claim 7, wherein said means adjustably connecting said platform to said bracket further includes a hitch ball adjustably secured to said bracket, said plate having a ball socket on the other side thereof for universal pivotal reception of said hitch ball, and means to secure said bumper bracket in adjusted position to said plate.

9. An article carrying device for a vehicle comprising in combination; a substantially horizontal stationary platform, an elongated movable plate pivoted about a vertical axis adjacent one end thereof to one end of said platform and moveable from a folded position overlying said platform to a position extending outwardly of and aligned with said platform, means to lock said plate to said platform in extended position, hinge means on said plate for connection to the article to be carried, latch means on said platform to secure said article thereto when the plate is in its folded position, and means to rigidly attach said platform to a vehicle frame.

10. An article carrying device as defined in claim 9, wherein said means to attach said platform to a vehicle frame includes a bumper attached bracket, a tongue fixed to said platform, and a tongue receiving socket; ball and socket means permitting of universal movement on said bracket and socket respectively, and means to lock said ball and socket means in adjusted position.

References Cited in the file of this patent

UNITED STATES PATENTS

| | | |
|---|---|---|
| 2,071,644 | McBrady | Feb. 23, 1937 |

FOREIGN PATENTS

| | | |
|---|---|---|
| 2,447 | Great Britain | 1913 |
| 27,602 | Great Britain | 1910 |
| 636,257 | Great Britain | Apr. 26, 1950 |